United States Patent [19]

Nakamura et al.

[11] Patent Number: 6,015,850
[45] Date of Patent: Jan. 18, 2000

[54] RUBBER COMPOSITION

[75] Inventors: Masao Nakamura; Yukio Takagishi, both of Kanagawa, Japan

[73] Assignee: Nippon Zeon Co., Ltd., Tokyo, Japan

[21] Appl. No.: 08/913,413

[22] PCT Filed: Mar. 18, 1996

[86] PCT No.: PCT/JP96/00717

§ 371 Date: Sep. 17, 1997

§ 102(e) Date: Sep. 17, 1997

[87] PCT Pub. No.: WO96/29364

PCT Pub. Date: Sep. 26, 1996

[30] Foreign Application Priority Data

Mar. 17, 1995 [JP] Japan .................................... 7-086286

[51] Int. Cl.$^7$ .................................................. C08K 5/54
[52] U.S. Cl. .................... 524/188; 524/265; 524/267; 524/493
[58] Field of Search ..................... 524/188, 265, 524/267, 493

[56] References Cited

U.S. PATENT DOCUMENTS

| | | |
|---|---|---|
| 4,753,976 | 6/1988 | Yoshioka et al. . |
| 5,059,648 | 10/1991 | Fukushima et al. . |
| 5,089,554 | 2/1992 | Bomo et al. . |
| 5,409,969 | 4/1995 | Hamada . |

FOREIGN PATENT DOCUMENTS

| | | |
|---|---|---|
| 29 33 247 | 3/1980 | Germany . |
| 56-135532 | 10/1981 | Japan . |
| 57-195757 | 12/1982 | Japan . |
| 62-48743 | 3/1987 | Japan . |
| 62-62838 | 3/1987 | Japan . |
| 3-111439 | 5/1991 | Japan . |
| 3-252431 | 11/1991 | Japan . |
| 3-252433 | 11/1991 | Japan . |
| 6-248116 | 9/1994 | Japan . |

*Primary Examiner*—Melvyn I. Marquis
*Attorney, Agent, or Firm*—Armstrong, Westerman, Hattori, McLeland & Naughton

[57] ABSTRACT

Disclosed herein are a rubber composition comprising a diene rubber and silica, wherein (i) the silica is compounded in a proportion of 10–150 parts by weight per 100 parts by weight of the diene rubber, and (ii) a silicone oil having a polar group at its side chain or terminal is compounded in a proportion of 0.1–50 parts by weight per 100 parts by weight of the silica, and has excellent rebound resilience, tensile property, abrasion property and processability, and a preparation process thereof.

22 Claims, No Drawings

RUBBER COMPOSITION

TECHNICAL FIELD

The present invention relates to rubber compositions obtained by compounding silica as a reinforcing agent into a diene rubber, and more particularly to rubber compositions, which are excellent in rebound resilience and moreover superb in tensile property, abrasion property and processability.

BACKGROUND ART

As much importance has been attached to saving in resources and countermeasures to environment in recent years, requirements to reduce fuel consumption of automobiles have been increasingly severe. Automobile tires have also been required to low their rolling resistance so as to contribute to reduction in the fuel consumption. In order to low the rolling resistance of tires, a rubber material capable of providing vulcanized rubber having high rebound resilience is used as a rubber material for the tires.

It has heretofore been proposed to use a rubber composition obtained by compounding silica as a reinforcing agent into a diene rubber in place of carbon black so as to enhance rebound resilience. However, the silica-compounded rubber composition has involved a problem that it cannot bring about sufficient abrasion resistance and tensile strength compared with the carbon black-compounded rubber composition. A cause for this problem is considered to be attributed to the fact that the affinity of the silica for the diene rubber is lower than that of the carbon black, so that a reinforcing effect cannot be sufficiently developed.

In order to enhance the affinity of the silica for the diene rubber, it has heretofore been proposed to use a silane coupling agent (Japanese Patent Application Laid-Open Nos. 252431/1991 and 252433/1991, etc.). However, this method requires to use an expensive silane coupling agent in a large amount for bringing about a sufficient effect.

It has recently been proposed to use silica surface-treated with a silicone oil having a repeating unit of —Si(CH$_3$)$_2$—O— and/or —SiHCH$_3$—O— (Japanese Patent Application Laid-Open No. 248116/1994). However, this method requires to conduct a heat treatment at 250° C. for about 1 hour for the surface treatment of the silica, so that a sufficient effect cannot be achieved by simply kneading a diene rubber, silica and such a silicone oil in a lot in a common roll or Banbury.

DISCLOSURE OF THE INVENTION

It is an object of the present invention to provide a rubber composition which comprises a diene rubber component and silica, is excellent in rebound resilience which is taken as an index to rolling resistance, exhibits tensile strength and abrasion resistance equal to or higher than those of a carbon black-compounded rubber composition and is also good in processability.

The present inventors have carried out an extensive investigation with a view toward overcoming the above-described problems involved in the prior art. As a result, it has been found that when a silicone oil having a polar group such as an epoxy group, hydroxyalkyl group or alkoxy group is used for the purpose of enhancing the affinity of silica for a diene rubber, a rubber composition having good processability and exhibiting high rebound resilience and sufficient tensile strength and abrasion resistance can be provided even by charging the diene rubber, silica and the silicone oil having a polar group in a lot into a kneader such as a Banbury and kneading them without surface-treating silica with the silicone oil in advance, thus leading to completion of the present invention.

According to the present invention, there is thus provided a rubber composition comprising a diene rubber and silica, wherein (i) silica having a specific surface area ranging from 50 to 400 m$^2$/g as determined by nitrogen absorption (BET method) is compounded in a proportion of 10–150 parts by weight per 100 parts by weight of the diene rubber, and (ii) a silicone oil having a polar group at its side chain or terminal is compounded in a proportion of 0.1–50 parts by weight per 100 parts by weight of the silica.

BEST MODE FOR CARRYING OUT THE INVENTION

The present invention will hereinafter be described in detail.

Diene rubber:

No particular limitation is imposed on the diene rubber useful in the practice of the present invention. However, examples of the diene rubber include natural rubber (NR), polyisoprene rubber (IR), emulsion-polymerized styrene-butadiene copolymer rubber (SBR), solution-polymerized random SBR (bound styrene: 5–50 wt. %; 1,2-bond content of butadiene unit moiety: 10–80%), high-trans SBR (trans content of butadiene moiety: 70–95%), low-cis polybutadiene rubber (BR), high-cis BR, high-trans BR (trans content of butadiene moiety: 70–95%), styrene-isoprene copolymer rubber (SIR), butadiene-isoprene copolymer rubber, solution-polymerized random styrene-butadiene-isoprene terpolymer rubber (SIBR), emulsion-polymerized SIBR, emulsion-polymerized styrene-acrylonitrile-butadiene terpolymer rubber, acrylonitrile-butadiene copolymer rubber, high-vinyl SBR-low-vinyl SBR block copolymer rubber, and block copolymers such as polystyrene-polybutadiene-polystyrene block copolymers. The diene rubber may be suitably selected from among these diene rubbers according to properties required. These diene rubbers may be used singly or in any combination thereof. Among these, NR, BR, IR, SBR and SIBR are preferred.

No particular limitation is imposed on the Mooney viscosity (ML$_{1+4}$, 100° C.) of the diene rubber used in the present invention. However, the Mooney viscosity is within a range of generally 20–150, preferably 30–100 from the viewpoint of mechanical strength, processability and the like. However, the Mooney viscosity may exceed 150 when the diene rubber is used after subjected to oil extension.

Silica:

As the silica useful in the practice of the present invention, any silica commonly used for compounding into general-purpose rubber may be used. Specific examples thereof include dry process white carbon, wet process white carbon, colloidal silica and precipitated silica disclosed in Japanese Patent Application Laid-Open No. 62838/1987, which are generally used as reinforcing agents. Of these, wet process white carbon comprising hydrous silicic acid as a main component is preferred.

The specific surface area of the silica is generally within a range of 50–400 m$^2$/g, preferably 100–250 m$^2$/g, more preferably 120–190 m$^2$/g in terms of a specific surface area determined by nitrogen absorption (BET method). If the specific surface area of the silica is too small, its reinforcing ability becomes poor. On the other hand, any specific surface area too large results in a rubber composition deteriorated in processability and not sufficiently improved in abrasion resistance and rebound resilience. The specific surface area determined by nitrogen absorption as used herein is a value determined by the BET method in accordance with ASTM D 3037-81.

A proportion of the silica to be used is 10–150 parts by weight, preferably 20–120 parts by weight, more preferably 40–80 parts by weight, per 100 parts by weight of the diene rubber component. If the compounding proportion of the silica is too low, its reinforcing ability is not sufficiently exhibited. On the other hand, any proportion too high results in an unvulcanized rubber composition having an increased viscosity and hence deteriorated processability.

Silicone oil:

The feature of the silicone oil useful in the practice of the present invention resides in that it has a polar group at its side chain or terminal. Preferable examples of the polar group include substituent groups having at least one heteroatom or at least one atomic group comprising a heteroatom. Examples of heteroatoms include oxygen, sulfur and nitrogen atoms.

Specific examples of the polar group include hydroxyl, amino, carboxyl, oxy (ether, epoxy), carbonyl, ester, sulfide, disulfide, sulfonyl, sulfinyl, thiocarbonyl, imino, nitrile, ammonium, amide, imide, hydrazo, azo and diazo groups.

Examples of the silicone oil having such a polar group include organopolysiloxanes represented by the following general formulae (1) to (3).

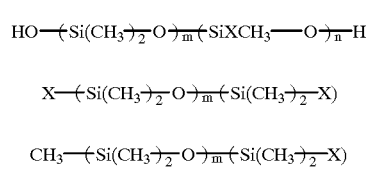

In the formulae, m denotes an integer of generally 1–10,000, preferably 1–1,000, more preferably 1–500. n stands for an integer of generally 1–1,000, preferably 1–500, more preferably 1–100.

X means an organic residue having the above-described polar group. Examples of the organic residue include alkyl, alkenyl, alkynyl, aryl and aralkyl groups. An alkyl group is preferred. Specific examples of X include hydroxyalkyl, aminoalkyl, carboxylalkyl, epoxyalkyl, alkoxy, alkoxyalkyl, acyl, acylalkyl, acyloxy and acyloxyalkyl groups. Among these groups, the hydroxyalkyl, aminoalkyl, carboxylalkyl, epoxyalkyl and alkoxy groups are preferred, with the alkoxy groups being particularly preferred. The number of carbon atoms in the organic residue is within a range of generally 1–20, preferably 1–10, more preferably 1–6.

The viscosity of the silicone oil having the polar group is within a range of generally 1–1,000,000 cSt (mm²/s), preferably 1–100,000 cSt, more preferably 5–10,000 cSt.

A proportion of the silicone oil to be used is within a range of 0.1–50 parts by weight, preferably 0.5–40 parts by weight, more preferably 1–30 parts by weight, per 100 parts by weight of the silica. If the proportion of the silicone oil to be used is lower than 0.1 parts by weight, its effect of enhancing the affinity of the silica for the diene rubber becomes small. On the other hand, any proportion exceeding 50 parts by weight is not economical because its effect shows a tendency to be saturated.

Silane coupling agent:

When a silane coupling agent is added to the rubber composition according to the present invention, the effects of improving rebound resilience and abrasion resistance become more marked.

No particular limitation is imposed on the silane coupling agent. However, examples thereof include vinyltrichlorosilane, vinyltriethoxysilane, vinyltris(β-methoxy-ethoxy)silane, β-(3,4-epoxycyclohexyl)-ethyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis[3-(triethoxy-silyl)propyl] tetrasulfide, and tetrasulfides described in Japanese Patent Application Laid-Open No. 248116/1994, such as γ-trimethoxysilylpropyldimethylthiocarbamyl tetrasulfide and γ-trimethoxysilylpropylbenzothiazyl tetrasulfide.

A proportion of the silane coupling agent to be used is generally within a range of 0.1–30 parts by weight, preferably 0.5–20 parts by weight, more preferably 1–10 parts by weight, per 100 parts by weight of the silica. If the proportion of the silane coupling agent to be used is lower than 0.1 parts by weight, its effect of enhancing the affinity of the silica for the diene rubber becomes small. On the other hand, any proportion exceeding 30 parts by weight is not economical because its effect shows a tendency to be saturated.

Rubber composition:

The rubber compositions according to the present invention can be obtained by kneading the individual components in accordance with a method known per se in the art. The rubber compositions according to the present invention may contain necessary amounts of other compounding agents such as vulcanizing agents, vulcanization accelerators, vulcanization aids, antioxidants, plasticizers, lubricants and fillers in addition to the above-described components.

Other compounding agents include those commonly used in a rubber industry, for example, vulcanizing agents such as sulfur and peroxides; vulcanization accelerators such as thiazole, thiuram, sulfenamide and guanidine types; vulcanization aides such as stearic acid and zinc white; activators such as diethylene glycol and polyethylene glycol; reinforcing agents, such as various grades of carbon black such as FEF, HAF, ISAF and SAF, and calcium carbonate; fillers such as thermal black, acetylene black, graphite, clay and talc; and plasticizers, antioxidants and process oils. Necessary compounding agents may be suitably selected from among these various compounding agents according to the purposes and applications of the resulting rubber compositions.

When the individual components are kneaded, the diene rubber component, silica and silicone oil are first mixed by means of a mixer such as a roll or Banbury, and the other compounding agents are then added and mixed, whereby a rubber composition further improved in dispersibility and having far excellent properties can be provided. In this case, the addition of silica may be conducted in a lot. However, when a predetermined amount of the silica is added in preferably two or more portions, the silica can be easily dispersed, so that the silica can be more easily mixed with the diene rubber component. For example, 10–90 wt. % of the whole amount of the silica may be added on the first time, and the remainder may be added on and after the second time. The silicone oil may also be preferably added in portions together with the silica.

Although the silane coupling agent and activator among the other compounding agents may be added upon the first mixing of the rubber component with the silica, other additives may preferably be added on and after the subsequent step. When other additives than the silane coupling agent and activator are added upon the first mixing of the rubber component with the silica, in some cases, the mixing time may be lengthened, and the reinforcing ability of the silica may be lowered. For example, when the compounding proportion of the silica or silicone oil is low, the silica is mixed with the silicone oil in advance, and the mixture may be then kneaded with the diene rubber.

The temperature at which the diene rubber component, silica and silicone oil are mixed is generally 80–200° C., preferably 100–190° C., more preferably 140–180° C. If the temperature is too low, the abrasion property is not very improved. If the temperature is too high on the other hand, burning of the polymer occurs. Therefore, both too low and too high mixing temperatures are not preferred. The mixing is generally conducted for at least 30 seconds, preferably 1–30 minutes.

EXAMPLES

The present invention will hereinafter be described specifically by the following Examples and Comparative Examples. Incidentally, all designations of "part" or "parts" and "%" as will be used in these examples mean part or parts by weight and wt. % unless expressly noted.

Various properties were determined in accordance with the following respective methods:
(1) Tensile strength, elongation and stress at 300% elongation:

The tensile strength, elongation and stress at 300% elongation of each test sample were determined in accordance with the tensile testing method described in JIS K 6301.
(2) Rebound resilience:

The rebound resilience of each test sample was determined at 60° C. by means of a Lüpke type rebound resilience tester in accordance with JIS K 6301.
(3) Abrasion resistance:

The abrasion resistance of each test sample was determined by means of a Pico abrasion tester in accordance with ASTM D 2228. This property is expressed in terms of an index (Pico abrasion index).
(4) Processability:

With respect to the processability of each test sample, winding tendency of an unvulcanized rubber composition on a roll was observed and evaluated in accordance with the following standard:

⊙: Wound closely;
○: Wound, but slightly rose to the surface of the roll;
Δ: Wound, but frequently rose to the surface of the roll;
X: Scarcely wound.

Examples 1–3,

Comparative Examples 1–3

As raw rubber, 70 parts of SBR (SBR1502, product of Nippon Zeon Co., Ltd.) and 30 parts of natural rubber (SMRCV60) were used to prepare rubber compositions comprising 100 parts of the raw rubber, 60 parts of silica [Ultrasil VN3G (specific surface area determined by nitrogen absorption=175 m²/g), product of Degussa AG], 3 parts of one of various kinds of silicone oils (shown in Table 2) having a polar group and other compounding agents on the basis of the compounding recipe and mixing process shown in Table 1.

More specifically, the raw rubber was kneaded at 120° C. for 30 seconds in a 250 ml-Banbury mixer, and half amounts of the silica (30 parts) and the silicone oil (1.5 parts) were then added to knead them. After kneaded for 2 minutes, the remaining halves of the silica (30 parts) and the silicone oil (1.5 parts), and other compounding agents except for sulfur and a vulcanization accelerator were added to knead the mixture further for 6 minuets. The maximum temperature attained was about 170° C. The mixture thus obtained, sulfur and the vulcanization accelerator were then added to an open roll controlled at 50° C. to knead them. The kneaded mixture was then press-vulcanized at 160° C. for 25 minutes to produce test pieces, thereby determining various physical properties. The results are shown in Table 2.

TABLE 1

| Mixing | First | Second | Third |
| --- | --- | --- | --- |
| Raw rubber | 100 | — | — |
| Silica | Half | Half | — |
| Silicone oil | Half | Half | — |
| Silane coupling agent | Half | Half | — |
| Zinc white | — | 3 | — |
| Stearic acid | — | 2 | — |
| Aromatic oil | — | 10 | — |
| Antioxidant (*1) | — | 1 | — |
| Vulcanization accelerator (*2) | — | — | 1 |
| Vulcanization accelerator (*3) | — | — | 1 |
| Sulfur | — | — | 1.8 |

(*1) Nocrac 6C produced by Ouchi-Shinko Chemical Industrial Co., Ltd.
(*2) Nocceler CZ produced by Ouchi-Shinko Chemical Industrial Co., Ltd.
(*3) Nocceler D produced by Ouchi-Shinko Chemical Industrial Co., Ltd.

TABLE 2

| | Example | | | Comp. Example | | |
| --- | --- | --- | --- | --- | --- | --- |
| | 1 | 2 | 3 | 1 | 2 | 3 |
| SBR (*1) | 70 | 70 | 70 | 70 | 70 | 70 |
| Natural rubber (*2) | 30 | 30 | 30 | 30 | 30 | 30 |
| Silica (*3) | 60 | 60 | 60 | 60 | 60 | 60 |
| Silicone oil (kind) | SiOR (*5) | SiNH$_2$ (*6) | SiCOOH (*7) | KF96 (*8) | — | — |
| (parts) | 3 | 3 | 3 | 3 | | |
| Silane coupling agent (*4) (parts) | — | — | — | — | 1 | — |
| Tensile strength (Kgf/cm²) | 255 | 240 | 233 | 190 | 200 | 170 |
| Elongation (%) | 510 | 460 | 450 | 460 | 400 | 480 |
| Stress at 300% (Kgf/cm²) | 120 | 90 | 100 | 40 | 95 | 38 |
| Rebound resilience | 63 | 61 | 62 | 54 | 60 | 55 |
| Abrasion resistance | 223 | 280 | 153 | 107 | 178 | 100 |
| Processability on roll | ⊙ | ⊙ | ⊙ | Δ | Δ | X |

(*1) Nipol SBR1502 produced by Nippon Zeon Co., Ltd. (bound styrene content: 23.5%, Mooney viscosity: 50, 1,2-vinyl bond content of butadiene moiety: 19%)
(*2) SMRCV60 (Mooney viscosity: 60)
(*3) Ultrasil VN3G produced by Degussa AG (specific surface area determined by nitrogen absorption = 175 m²/g)
(*4) Si69 produced by Degussa AG
(*5) FZ3704 produced by Nippon Unicar Co., Ltd. [alkoxy group-containing silicone oil, viscosity: 7 cSt (25° C.)]
(*6) FZ3705 produced by Nippon Unicar Co., Ltd. [amino group-containing silicone oil, viscosity: 220 cSt (25° C.)]
(*7) FZ3703 produced by Nippon Unicar Co., Ltd. [carboxyl group-containing silicone oil, viscosity: 3,000 cSt (25° C.)]
(*8) KF96-10 produced by Shin-Etsu Chemical Co., Ltd. [Dimethyl silicone oil, viscosity: 10 cSt (25° C.)].

As apparent from the results shown in Table 2, it is understood that the rubber compositions (Examples 1–3) making use of the respective silicone oils having a polar groups such as an alkoxy group, amino group or carboxyl group have excellent tensile strength and tensile stress without deteriorating elongation property and are sufficiently improved in rebound resilience, abrasion resistance and processability on roll. On the other hand, the addition of the silicone oil having no polar group results in a rubber composition in which the improving effect is scarcely recognized (Comparative Example 1). The addition of only the silane coupling agent results in a rubber composition having poor elongation property and not sufficiently improved in tensile strength and processability (Comparative Example 2). Neither silicone oil nor silane coupling agent is compounded into the rubber composition of Comparative Example 3.

Examples 4–8

Comparative Examples 4–5

Rubber compositions were prepared on the basis of the compounding recipe and mixing process according to Example 1 except that the kind of the raw rubber, the compounding proportion of the silicone oil having a polar group and the like were changed as shown in Table 3, and test pieces were produced in the same manner as in Example 1 to determine various physical properties. The results are shown in Table 3.

TABLE 3

|  | Example | | | | | Comp. Example | |
| --- | --- | --- | --- | --- | --- | --- | --- |
|  | 4 | 5 | 6 | 7 | 8 | 4 | 5 |
| SBR (*1) (parts) | 100 | 100 | 100 | 70 | 50 | 100 | — |
| Natural rubber (*2) (parts) | — | — | — | 30 | 20 | — | 100 |
| BR (*3) (parts) | — | — | — | — | 30 | — | — |
| Silica (*4) (parts) | 60 | 60 | 60 | 60 | 60 | 60 | 60 |
| Silicone oil (*5) (parts) | 1 | 5 | 15 | 5 | 5 | — | — |
| Silane coupling agent (*6) (parts) | 1 | 1 | 1 | 1 | 1 | 1 | 1 |
| Tensile strength (Kgf/cm$^2$) | 173 | 190 | 180 | 230 | 210 | 120 | 240 |
| Elongation (%) | 350 | 400 | 450 | 450 | 510 | 340 | 620 |
| Stress at 300% (Kgf/cm$^2$) | 105 | 130 | 127 | 148 | 133 | 65 | 55 |
| Rebound resilience | 62 | 63 | 62 | 65 | 66 | 54 | 59 |
| Abrasion resistance | 126 | 135 | 116 | 148 | 153 | 80 | 100 |
| Processability on roll | ○ | ○ | ◎ | ◎ | ◎ | △ | ○ |

(*1) Nipol NS116 produced by Nippon Zeon Co., Ltd. (bound styrene content: 21%, Mooney viscosity: 46)
(*2) SMRCV60 (Mooney viscosity: 60)
(*3) Nipol BR 1220 produced by Nippon Zeon Co., Ltd. (Mooney viscosity: 42, cis-content of butadiene moiety: 96%)
(*4) Ultrasil VN3G produced by Degussa AG (specific surface area determined by nitrogen absorption = 175 m$^2$/g)
(*5) FZ3704 produced by Nippon Unicar Co., Ltd.
(*6) Si69 produced by Degussa AG.

As apparent from the results shown in Table 3, it is understood that the rubber compositions (Examples 4–8) according to the present invention are excellent in rebound resilience and moreover superb in tensile property, abrasion property and processability.

INDUSTRIAL APPLICABILITY

According to the present invention, there can be provided rubber compositions which can be greatly improved in tensile strength and abrasion resistance, which have hitherto been weak points of silica-compounded rubber materials, without impairing good rebound resilience which constitutes a feature of such rubber materials, and have excellent processability. The rubber compositions according to the present invention can be used in various fields of applications, for example, various parts for tires, such as treads, carcasses, sidewalls and beads; rubber products such as hoses, window frames, belts, shoe soles, rubber vibration insulators and automobile parts; and toughening rubbers for resins such as impact-resistant polystyrene and ABS resins, making good use of their excellent properties.

Although the rubber compositions according to the present invention have excellent rebound resilience and are hence suitable for use, in particular, as rubber materials for tire treads of fuel consumption-reducing tires, they are also suitable for use as rubber materials for tire treads, sidewalls, under treads, carcasses, beads and the like of all-season tires, high performance tires, studless tires, etc.

We claim:

1. A rubber composition comprising a diene rubber, silica and silicone oil, wherein (i) silica having a specific surface area ranging from 120 to 190 m$^2$/g as determined by nitrogen absorption (BET method) is present in a proportion of 10–150 parts by weight per 100 parts by weight of the diene rubber, and (ii) silicone oil having a polar group at its side chain or terminal is present in a proportion of 0.1–50 parts by weight per 100 parts by weight of the silica.

2. The rubber composition according to claim 1, wherein a silane coupling agent is present in a proportion of 0.1–20 parts by weight per 100 parts by weight of the silica.

3. The rubber composition according to claim 1 or 2, wherein the diene rubber is at least one selected from among natural rubber, polyisoprene rubber, styrene-butadiene copolymer rubber, polybutadiene rubber, styrene-isoprene copolymer rubber, butadiene-isoprene copolymer rubber or random styrene-butadiene-isoprene terpolymer rubber.

4. The rubber composition according to claim 1 or 2, wherein the silica is at least one selected from among dry process white carbon, wet process white carbon, colloidal silica or precipitated silica.

5. The rubber composition according to claim 1 or 2, wherein the polar group in the silicone oil is a group having at least one heteroatom or at least one group comprising a heteroatom, said heteroatom is at least one selected from among oxygen, sulfur or nitrogen atoms.

6. The rubber composition according to claim 1 or 2, wherein the polar group is at least one selected from among hydroxyl, amino, carboxyl, ether, epoxy, carbonyl, ester, sulfide, disulfide, sulfonyl, sulfinyl, thiocarbonyl, imino, nitrile, ammonium, amide, imide, hydrazo, azo or diazo groups.

7. The rubber composition according to claim 1 or 2, wherein the silicone oil having a polar group at its side chain or terminal is represented by the following general formula (1), (2) or (3):

(1)

(2)

(3)

wherein m denotes an integer of generally 1–10,000, n stands for an integer of generally 1–1,000, and X means an organic residue having a polar group.

8. The rubber composition according to claim 7, wherein the organic residue is an alkyl, alkenyl, alkynyl, aryl or aralkyl group.

9. The rubber composition according to claim 7, wherein X is a hydroxyalkyl, aminoalkyl, carboxylalkyl, epoxyalkyl, alkoxy, alkoxyalkyl, acyl, acylalkyl, acyloxy or acyloxyalkyl group.

10. The rubber composition according to claim 9, wherein X is a hydroxyalkyl, aminoalkyl, carboxylalkyl, epoxyalkyl or alkoxy group.

11. The rubber composition according to claim 8, wherein, the number of carbon atoms in the organic residue is within a range of generally 1–20.

12. The rubber composition according to claim 1, wherein the viscosity of the silicone oil having a polar group at its side chain or terminal is within a range of 1–1,000,000 cSt.

13. A method for preparing a rubber composition, comprising:
mixing concurrently
a diene rubber,
a silica having a specific surface area ranging from 120 to 190 m$^2$/g as determined by nitrogen absorption (BET method) in a proportion of 10–150 parts by weight per 100 parts by weight of a diene rubber, wherein the entire amount of silica is introduced and mixed with the diene rubber in at least two portions, each portion less than the entire amount and the combination of the portions totaling the entire amount and
a silicone oil having a polar group at its side chain or terminal in a proportion of 0.1–50 parts by weight per 100 parts by weight of the silica;
followed by mixing other desired ingredients.

14. The method according to claim 13 for preparing the rubber composition, wherein a silane coupling agent is further compounded in a proportion of 0.1–20 parts by weight per 100 parts by weight of the silica.

15. The method according to claim 13 for preparing the rubber composition, wherein the mixing is conducted at a kneading temperature of 80–200° C.

16. The method according to claims 13 or 14 for preparing the rubber composition, wherein a silane coupling agent is present in a proportion of 0.1–20 parts by weight per 100 parts by weight of the silica.

17. The rubber composition of claim 7, wherein m denotes an integer of 1–1,000 and n stands for an integer of 1–500.

18. The rubber composition of claim 7, wherein m denotes an integer of 1–500 and n stands for an integer of 1–100.

19. The rubber composition according to claim 11, wherein the number of carbon atoms in the organic residue is within a range of 1–10.

20. The rubber composition according to claim 11, wherein the number of carbon atoms in the organic residue is within a range of 1–6.

21. The method according to claim 13 for preparing the rubber composition, wherein the silicone oil is added and mixed in portions together with the silica.

22. The method according to claim 14 for preparing the rubber composition, wherein the mixing is conducted at a kneading temperature of 80–200C.

* * * * *